US010966372B1

(12) United States Patent
Anspach (10) Patent No.: US 10,966,372 B1
(45) Date of Patent: Apr. 6, 2021

(54) COVER FOR USE WITH RING AND CRADLE STYLE ROUND BALE FEEDERS

(71) Applicant: Deborah A. Anspach, Harrisville, PA (US)

(72) Inventor: Deborah A. Anspach, Harrisville, PA (US)

( * ) Notice: Subject to any disclaimer, the term of this patent is extended or adjusted under 35 U.S.C. 154(b) by 0 days.

(21) Appl. No.: 16/889,932

(22) Filed: Jun. 2, 2020

Related U.S. Application Data

(60) Provisional application No. 62/953,625, filed on Dec. 26, 2019.

(51) Int. Cl.
| *A01F 25/13* | (2006.01) |
| *B65B 27/12* | (2006.01) |
| *E04H 4/10* | (2006.01) |
| *A01K 5/01* | (2006.01) |

(52) U.S. Cl.
CPC ............ *A01F 25/13* (2013.01); *B65B 27/125* (2013.01); *A01K 5/01* (2013.01); *E04H 4/10* (2013.01)

(58) Field of Classification Search
USPC ........................ 206/83.5, 410; D12/401, 403; 119/51.04, 58, 60, 51.01; 52/3, 63; 114/361; 150/154; D30/121, 131, 199
See application file for complete search history.

(56) References Cited

U.S. PATENT DOCUMENTS

| 410,387 | A | * | 9/1889 | Walsh | ................ | B65D 21/0234 |
| | | | | | | 220/4.24 |
| 443,619 | A | * | 12/1890 | Orr | ........................ | B65D 85/07 |
| | | | | | | 206/83.5 |
| 644,242 | A | * | 2/1900 | Combs | ..................... | A01F 25/16 |
| | | | | | | 52/3 |
| 2,635,562 | A | * | 4/1953 | Abramson | ............... | A01F 25/10 |
| | | | | | | 52/3 |
| 3,906,903 | A | * | 9/1975 | Vandewater | ............. | A01K 1/10 |
| | | | | | | 119/60 |
| 4,221,085 | A | * | 9/1980 | Conaghan | ................ | A01F 25/13 |
| | | | | | | 150/154 |
| 4,248,343 | A | * | 2/1981 | Schaefer | .................. | A01F 25/13 |
| | | | | | | 150/154 |
| 4,521,997 | A | * | 6/1985 | Tiberend | .................. | A01F 25/13 |
| | | | | | | 160/218 |
| 4,538,385 | A | * | 9/1985 | Kandarian | .............. | A01F 25/13 |
| | | | | | | 150/154 |
| 4,570,789 | A | * | 2/1986 | Fritz | ..................... | A01F 15/141 |
| | | | | | | 206/83.5 |

(Continued)

*Primary Examiner* — Gideon R Weinerth
(74) *Attorney, Agent, or Firm* — Karen Tang-Wai Sutton (57) ABSTRACT

A cover for a round bale feeder having a top wall joined to an uppermost edge of a side wall by a perimeter weld. A pocket, sized and shaped to hold a strap for a ratchet-strap assembly, is formed in a lowermost edged of the side wall. At least one access hole is formed into the pocket to allow access to the ratchet-strap assembly, and in some embodiments, two or more additional access holes allow the strap to be more easily positioned inside the pocket. The cover is sized and shaped so as to cover a ring-style or a cradle-style feeder holding a round bale, with the side wall extending downwards to cover a side of the bale feeder such that the pocket is positioned below the round bale to protect the bale from environmental moisture. An optional flap covering the access hole is present in some embodiments.

4 Claims, 6 Drawing Sheets

(56) References Cited

U.S. PATENT DOCUMENTS

| | | | | |
|---|---|---|---|---|
| 4,590,715 A * | 5/1986 | Pandell | | E04H 4/10 250/585 |
| 4,712,672 A * | 12/1987 | Roy | | A01F 25/13 206/83.5 |
| 4,869,363 A * | 9/1989 | Goldberg | | A01F 25/13 206/83.5 |
| 5,197,236 A * | 3/1993 | Calhoun | | A01F 25/13 52/3 |
| 5,386,905 A * | 2/1995 | Porter | | A01F 25/13 206/83.5 |
| 5,511,655 A * | 4/1996 | Porter | | A01F 25/13 150/154 |
| D371,228 S * | 6/1996 | Monin | | D30/121 |
| 5,586,519 A * | 12/1996 | Wilkinson | | A01K 5/01 119/60 |
| 5,669,183 A * | 9/1997 | Frentress | | A01F 25/13 206/83.5 |
| 5,671,551 A * | 9/1997 | Adam | | A01F 25/13 34/201 |
| 5,709,064 A * | 1/1998 | Swartz | | A01F 25/13 206/83.5 |
| 5,720,382 A * | 2/1998 | Porter | | A01F 25/13 150/154 |
| 5,826,283 A * | 10/1998 | Edwards | | E04H 4/10 4/503 |
| 6,224,139 B1 * | 5/2001 | Weyand | | B60J 7/104 296/100.15 |
| 6,286,157 B1 * | 9/2001 | Baumann | | E04H 4/103 4/498 |
| 6,497,196 B1 * | 12/2002 | Helton | | A01K 5/01 119/51.01 |
| 6,789,504 B1 * | 9/2004 | O'Neill | | A01K 1/10 119/58 |
| 7,117,879 B1 * | 10/2006 | Massey | | E04H 15/38 135/132 |
| 7,871,052 B2 * | 1/2011 | Baum | | B60P 3/343 248/505 |
| 9,021,625 B1 * | 5/2015 | Vagner, Jr. | | E04H 4/108 4/498 |
| D844,905 S * | 4/2019 | Crossing | | B65D 85/07 D30/121 |
| 10,542,680 B1 * | 1/2020 | White | | B65D 21/0215 |
| 2004/0035511 A1 * | 2/2004 | Rolph | | F23Q 25/00 150/154 |
| 2005/0155684 A1 * | 7/2005 | Lummis | | A01F 25/13 150/154 |
| 2005/0246964 A1 * | 11/2005 | Graham | | B60J 11/00 52/2.11 |
| 2006/0283531 A1 * | 12/2006 | Eisenbarth | | A01F 25/13 150/154 |
| 2007/0289682 A1 * | 12/2007 | Young | | B65D 65/02 150/154 |
| 2008/0110403 A1 * | 5/2008 | Lerner | | A01K 5/01 119/58 |
| 2009/0283045 A1 * | 11/2009 | Rutkowski | | A01F 25/13 119/51.01 |
| 2009/0293797 A1 * | 12/2009 | Kent | | B63B 17/02 114/361 |
| 2010/0212597 A1 * | 8/2010 | Wolfe | | A01K 5/0107 119/58 |
| 2010/0236113 A1 * | 9/2010 | McNally | | G09F 15/0025 40/538 |
| 2011/0180005 A1 * | 7/2011 | Aisthorpe | | A01K 5/0107 119/61.3 |
| 2012/0279453 A1 * | 11/2012 | Goodhart | | A01K 5/01 119/58 |
| 2013/0061795 A1 * | 3/2013 | Zirkelbach | | B63B 17/02 114/361 |
| 2016/0050883 A1 * | 2/2016 | Davis | | A01K 1/10 119/60 |
| 2017/0305503 A1 * | 10/2017 | Murphy | | B63B 17/02 |
| 2018/0049401 A1 * | 2/2018 | Slyter | | A01K 1/10 |
| 2018/0199539 A1 * | 7/2018 | Robison | | A01K 5/01 |
| 2020/0288640 A1 * | 9/2020 | Crumpler, Jr. | | B65B 63/02 |

* cited by examiner

COVER FOR USE WITH RING AND CRADLE STYLE ROUND BALE FEEDERS

CROSS-REFERENCE TO RELATED APPLICATIONS

Reference is made to and priority claimed from U.S. provisional application No. 62/953,625 filed on 26 Dec. 2019, whose disclosure is herein incorporated in its entirety by reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The present invention pertains to the field of outdoor livestock feeding equipment. Specifically, the invention is a removable cover for a ring or cradle-style bale feeder for use with a round bale.

Background Art

Horses and other pasture grazing livestock are often fed with hay bales, which are bundles of dried grass or alfalfa formed into squares or large round bales by hay baling equipment. Round bales are more economical and convenient for feeding larger groups of animals, such as horses or sheep in pasture settings, while square bales are convenient for feeding individual animals. One problem with outdoor feeding of hay bales is the issue of the hay becoming moldy due to rain or snow. Feed is expensive, and thus there are economic pressures to reduce waste and feed spoilage. In particular, farmers and ranchers in the equine industry must be especially careful about feed hay quality, because unlike ruminants, who can eat moldy hay without ill effect, horses that eat moldy hay often become sick. In mild cases, horses fed moldy hay can suffer from colic, weight loss, and diarrhea. Mycotoxins produced by some types of mold have been known to kill horses in severe cases, or cause serious respiratory illnesses in both horses and their owners. Given the costs associated with caring for sick horses, along with the cost of quality hay, horse owners try to protect their feed hay. Every farmer has attempted at one time or another to use a tarp to protect the round bale in the feeder, but tarps are difficult and awkward to use with ring and cradle-style feeders as there is no good way to secure the tarp to the feeder, and no easy way to properly position the tarp over the feeder. Many tarps fly off in heavy winds, and the shape of the tarp mean that part of the tarp is forever lying on the ground or otherwise in contact with soiled material that can then easily be transferred to the feed bale. To avoid the dirty, awkward work of applying and removing tarps over feeders, some horse owners attempt to feed small quantities of hay to their horses to minimize spoilage and waste, however this is time consuming and not a good solution when the feeder is in an inconvenient location in pasture far away from where the bales are stored. Round feed bales in particular are not designed to be fed in pieces; once hay is pulled from the bale, the bale tends to fall apart.

What is needed is a cover for a ring-style or cradle-style bale feeder that is easily positioned, secured, and then removed and stored by a single person. What is also needed is a cover that is durable and weatherproof.

DISCLOSURE OF INVENTION

A first aspect of the invention is a waterproof cover for a feeder assembly for feeding a round bale, the cover having a cover shape comprised of a top wall having an area bounded by a perimeter along an outermost edge, the perimeter welded to an uppermost edge of a side wall to form a welded seam. A pocket formed at a lowermost edge of the side wall has an outward-facing side and a feeder assembly-facing side. The pocket is sized and shaped to receive a strap for use with a ratchet-strap assembly. An access hole formed into an outward-facing side of the pocket is sized and shaped to receive the strap and to allow adjustment thereof, with optional additional access holes formed into either the outward-facing side or feeder-facing side of the pocket. The top wall is sized and shaped to cover a top of the feeder assembly holding a round bale such that the weld seam is positioned at the uppermost perimeter edge of the side wall of the feeder assembly.

In a second aspect of the invention, the cover includes the ratchet-strap assembly comprising a ratchet and the strap, the strap further comprised of a strap length, wherein the strap is inserted into the access hole and contained within the pocket, with the strap length adjustable by the ratchet through the access hole from along the outward-facing side.

In a third aspect of the invention, the cover is made of a weldable vinyl canvas.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components.
10 bale feeder cover or cover
12 first sheet
14 second sheet
16 top weld seam
18 third sheet
20 perimeter weld seam
22 pocket
24 access hole
26 ratchet strap assembly
26a strap
28 protective cover flap
30 cradle-style bale feeder assembly or cradle-style feeder
32 ring-style bale feeder assembly or ring-style feeder
34 round feed bale or feed bale or bale

DETAILED DESCRIPTION

Figure 1:
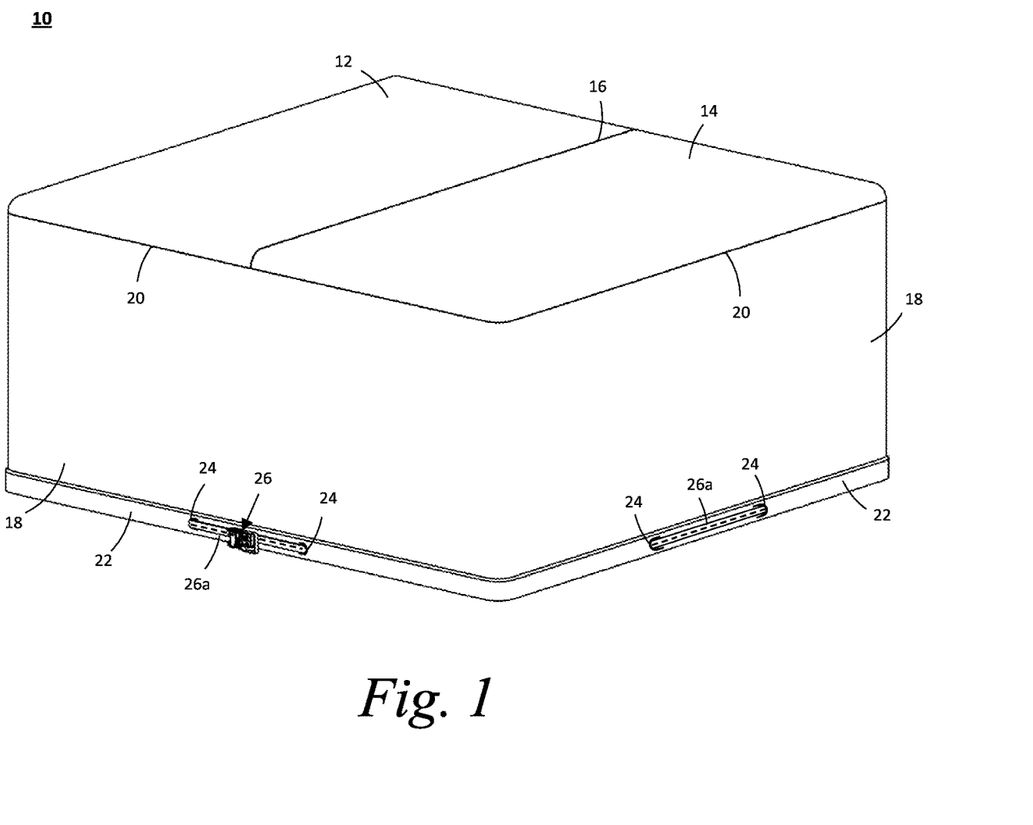
FIG. 1 is an isometric perspective view of a first embodiment of a cover for a round bale feeder according to the invention.
Figure 2A:
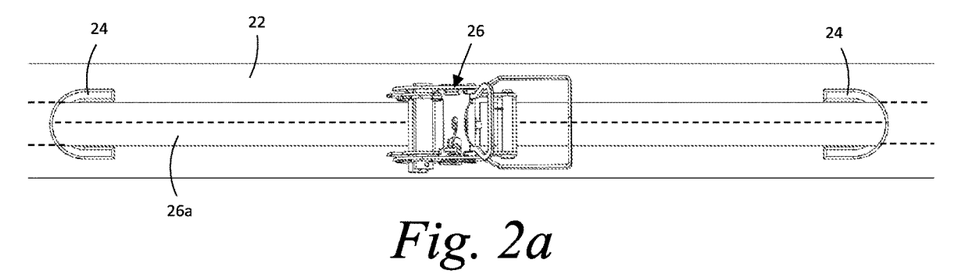
FIG. 2a is a detail view of a plurality of access holes and a ratchet-strap assembly entering a pocket of the cover in FIG. 1.
Figure 2B:
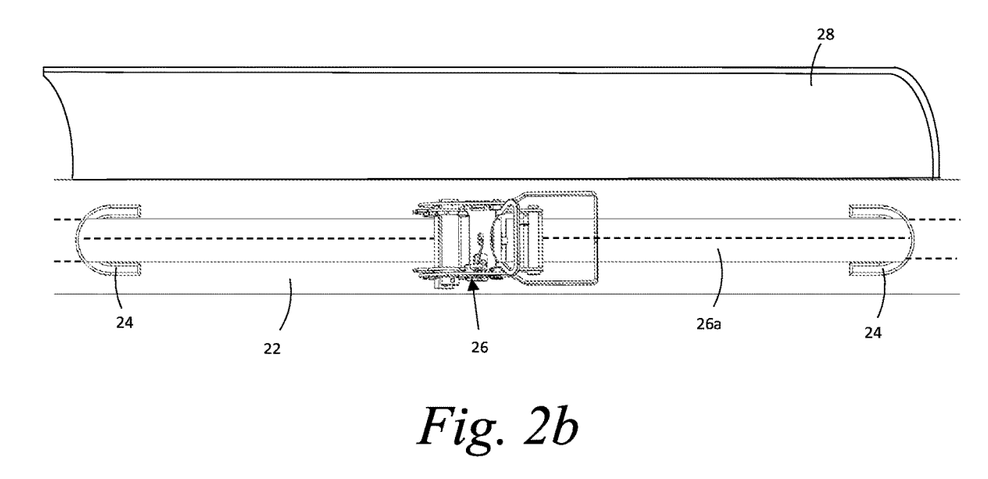
FIG. 2b is a same detail view in FIG. 2a, shown with an open protective cover flap.
Figure 2C:
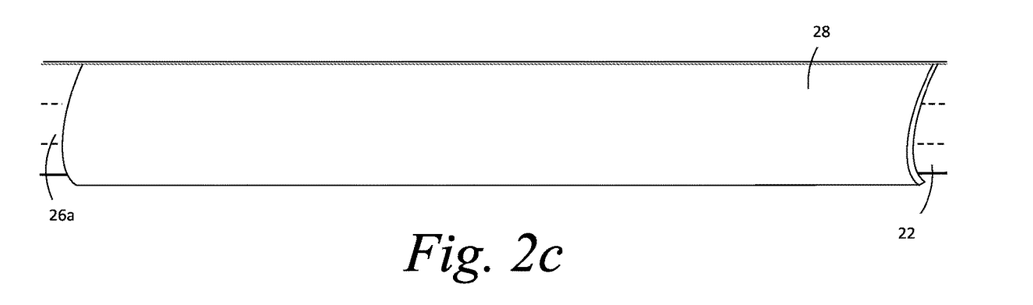
FIG. 2c is a detail view showing the protective cover flap in FIG. 2b over the ratchet-strap assembly and plurality of access holes.
Figure 3:
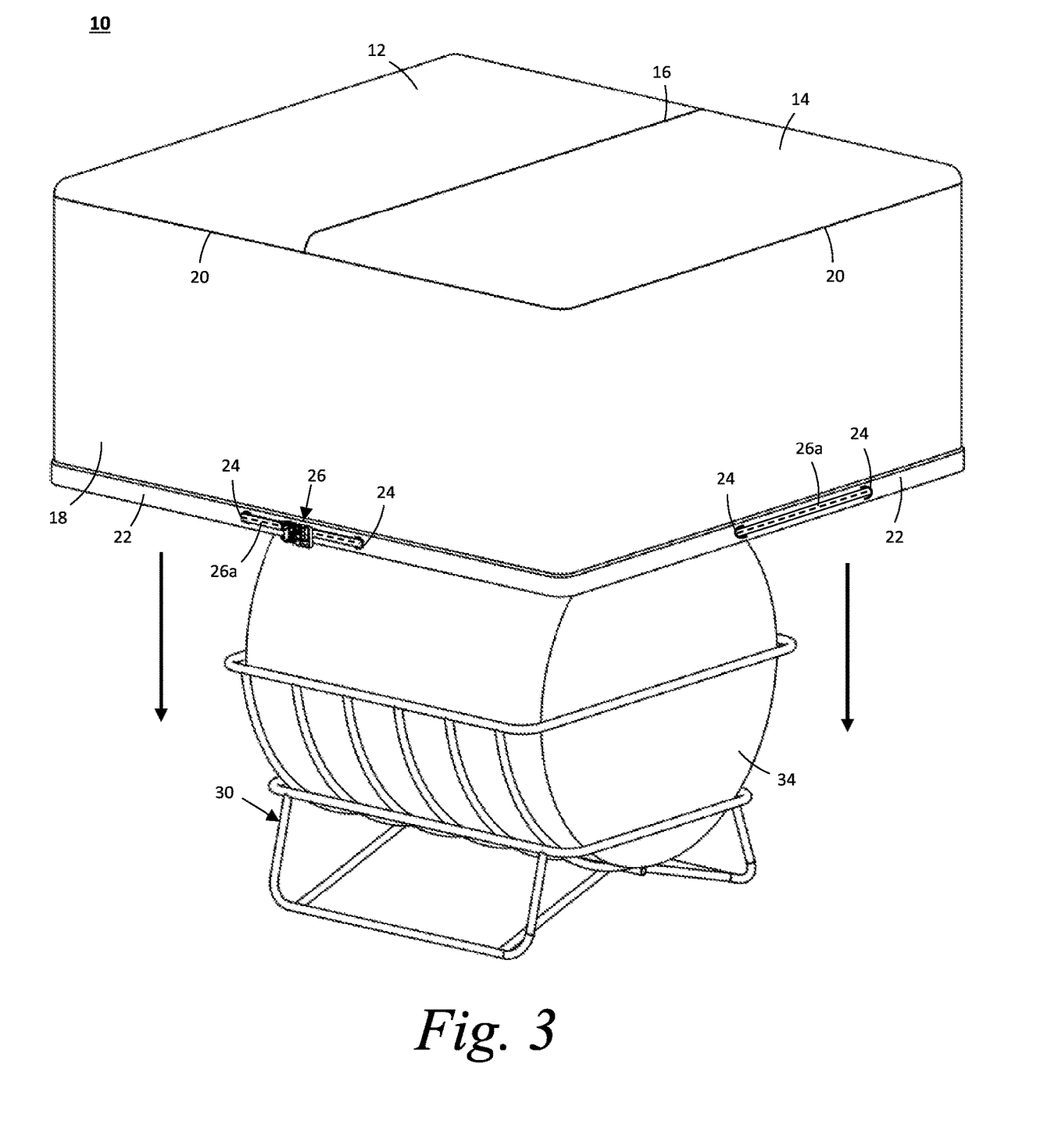
FIG. 3 is an isometric, partially exploded view of the cover and a cradle-style feeder.
Figure 4:
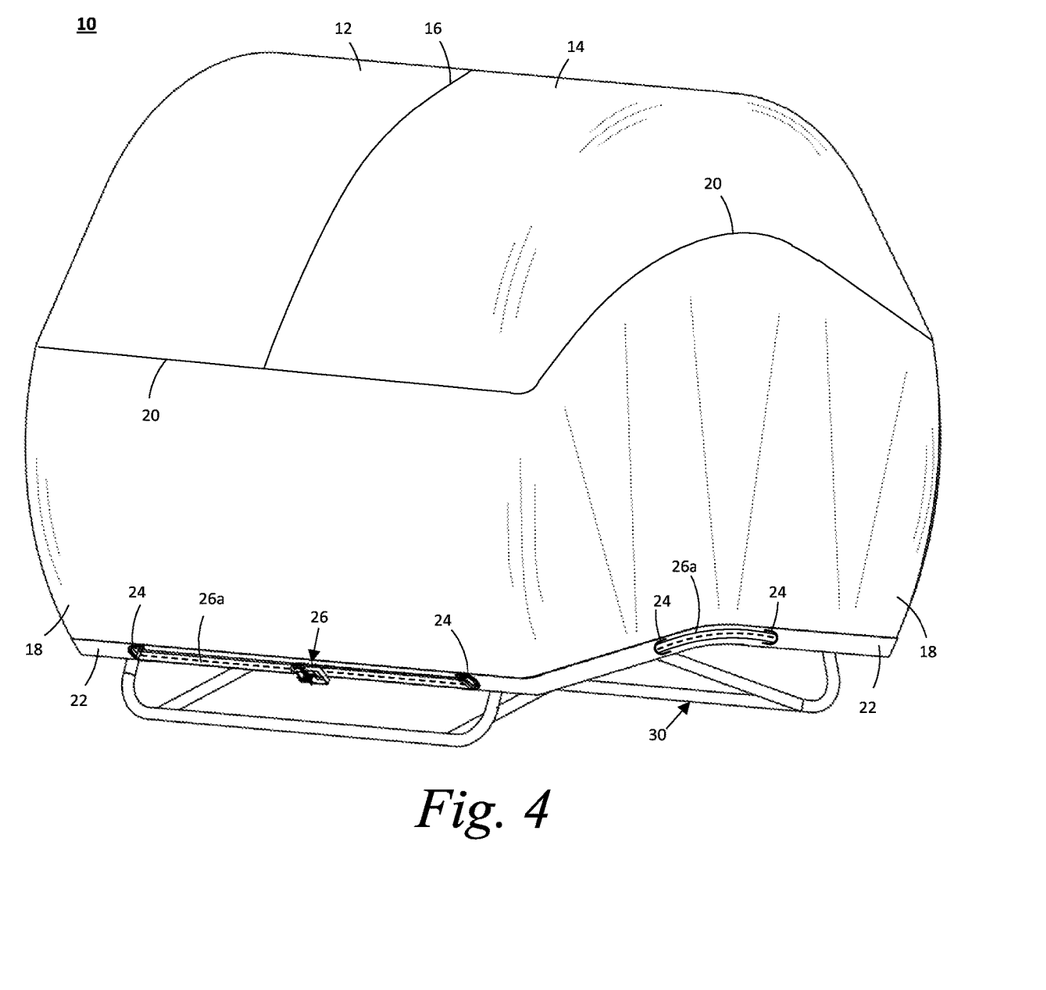
FIG. 4 is an isometric view of the cover and feeder in FIG. 3, shown with the cover fitted and secured to the cradle-style feeder.
Figure 5:
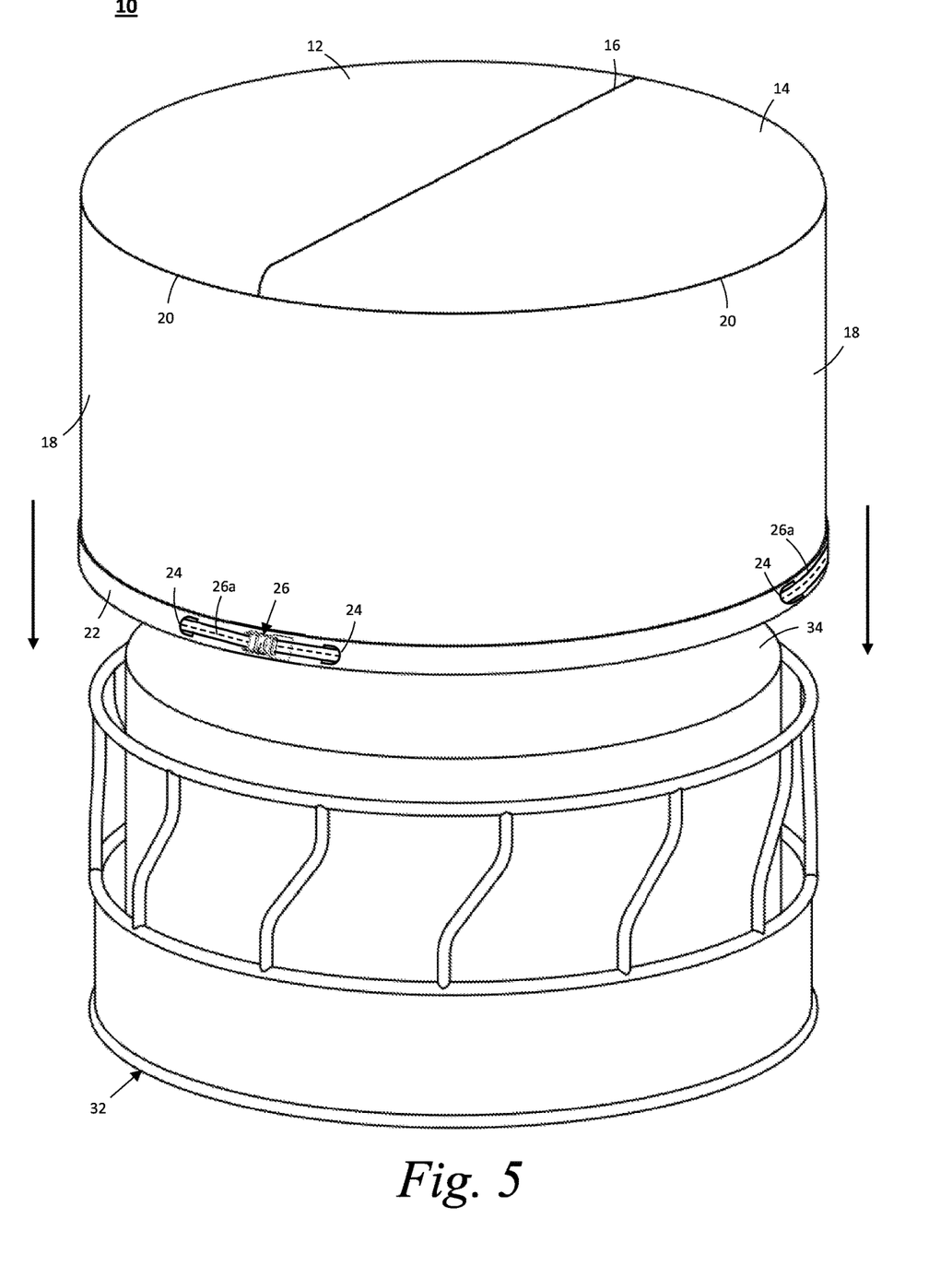
FIG. 5 is an isometric, partially exploded view of a second embodiment of the cover for use with a ring-style feeder.
Figure 6:
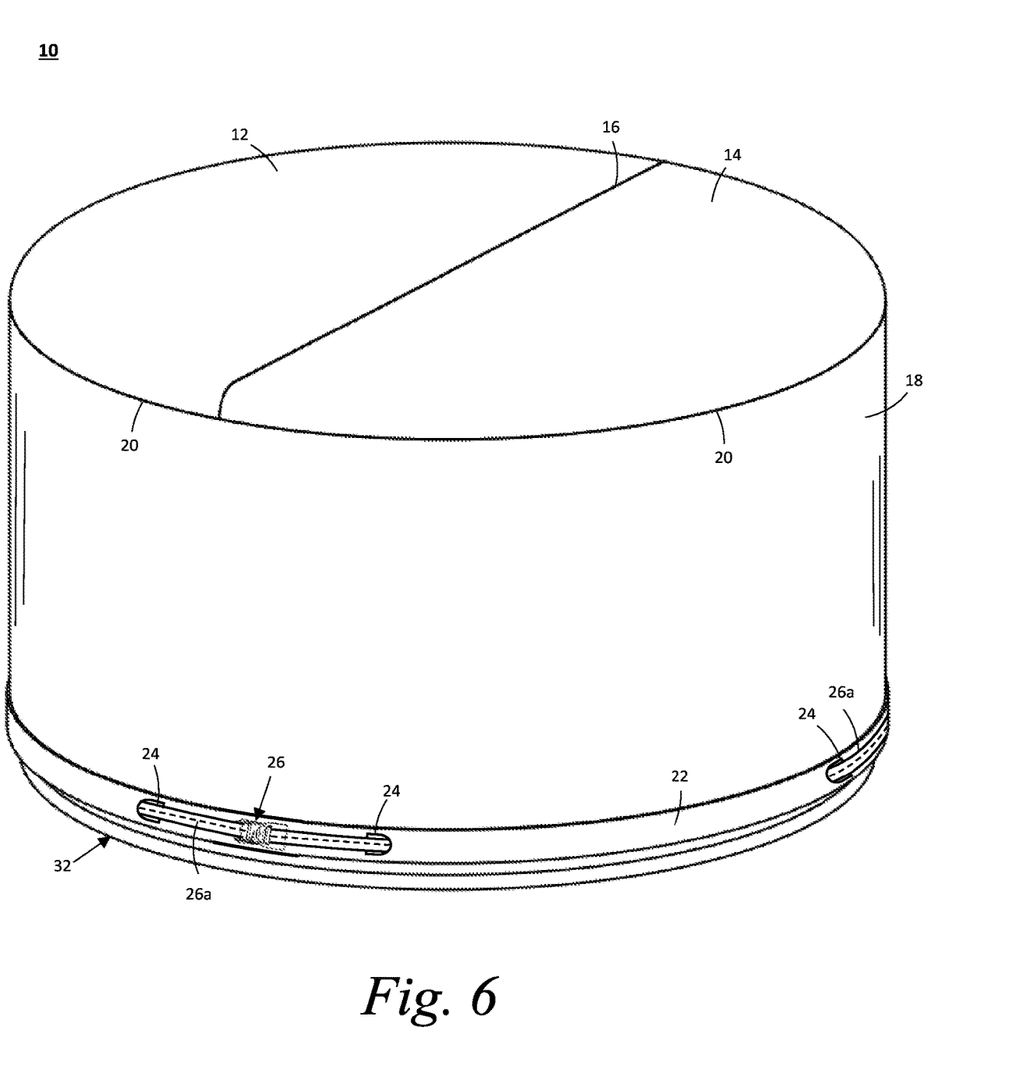
FIG. 6 is an isometric view of the cover and feeder in FIG. 5, shown with the cover fitted and secured over the ring-style feeder.

A cover for a round bale feeder according to the invention 10 is shown in FIGS. 1-6, where FIGS. 1, and 3-4 show a first embodiment of the cover 10 for a cradle-style feeder assembly 30 and FIGS. 5-6 show a second embodiment of the cover 10 adapted for a ring-style feeder assembly 32. FIGS. 2a-c are detail views of a ratchet-strap assembly 26 and access holes 24 used to secure the cover 10 to the feeder assembly 30 32. In this disclosure, the terms "feeder" and "feeder assembly" are used interchangeably to reflect common usage of "feeder" within the horse industry and "feeder assembly" reflecting that these feeders are in fact often comprised of two or more pieces.

Turning to the Figures, the cover 10 is comprised of a first sheet 12 and a second sheet 14 welded together at a top weld 16, forming a top wall of the cover 10. A third sheet 18 is welded to a perimeter of the top wall by a perimeter weld 20, with the third sheet 18 approximately perpendicular to the top wall and forming a side wall of the cover. In the embodiments shown, the side wall is a single continuous sheet, however the inventor notes that a vertical weld (not shown) joining opposed ends of the third sheet 18 is an optional embodiment. Welding of the sheets 12 14 18 is ideally done to ensure waterproof seams. A pocket 22 formed along a lowermost edge of the side of the cover is sized and shaped to receive a strap 26a of a ratchet-strap assembly 26 and one or more access holes 24, formed into the pocket 22, allow access to the ratchet-strap assembly 26 and to the strap 26a. The pocket 22 has an outward-facing side and a feeder assembly-facing side. In the Figures, the access holes 24 shown are U-shaped, through which the strap 26a is inserted. In some embodiments (not shown), the access hole 24 is configured as a single hole or elongated slot formed into the pocket 22 on the outward-facing side of the cover, the slot sized and shaped to allow access to the ratchet-strap assembly 26. In a typical embodiment, as shown in the Figures, where two or more access holes 24 are used, the access hole 24 through which the ratchet-strap assembly 26 is accessed is always formed on the outward-facing side of the pocket 22. Additional access holes 24 may be formed on either the outward-facing side or the feeder assembly-facing side, as desired. The inventor notes that additional access holes 24 formed at regular intervals along the pocket are useful as they allow the strap 26a to be more easily inserted into the pocket 22.

In some embodiments, shown in FIGS. 2b-c, the pocket 22 is further formed with a protective cover flap 28. The protective cover flap 28 in the embodiment shown in the Figures is a separate piece of material typically welded to the side of the cover 10 immediately above the access hole 24 through which the ratchet-strap assembly 26 is accessed. The protective cover flap 28 may also be formed as a simple flap cut into the outward-facing side of the pocket when the elongated slot embodiment of the access hole 24 is used. The protective cover flap 28 can be optionally removably affixed to the cover by hook and loop fasteners, snaps, or any other useful fastening assembly as desired. The protective cover 28 is optional and helps protect the ratchet-strap assembly 26, extending the life of the ratchet-strap assembly 26 but is not necessary for the functioning of the cover 10.

The cover 10 in a typical embodiment, is made of heavyweight 10 oz. vinyl canvas appropriate for outdoor use. The vinyl canvas used by the inventor has a 10 year wear guarantee to withstand normal weathering and outdoor use. All welds 16 20 and including the formation of the pocket 22 are made using a welding machine such as the T600 Extreme Shelter Tent Welder/Shade/Flex machine by the Miller Weldmaster Corp of Navarre, Ohio, which welds material quickly and economically, without piercing the material and therefore maintaining its waterproof characteristics.

FIGS. 3-4 show how the cover 10 is used with the cradle-style feeder assembly 30. The ratchet-strap assembly 26 is loosened to allow the cover 10 to be positioned over a top of a feeding bale 34 contained inside the feeder assembly 30. The cover 10 is pulled down over a top side and a side wall of the feeder assembly 30, and the strap 26a is tightened with the ratchet until secure, with these steps reversed to remove the cover 10. The cover 10, when not in use, is easily folded and stored compared to a tarp repurposed as a feeder cover. Similarly, FIGS. 5-6 show an embodiment of the cover 10 for the ring-style feeder assembly 32, having a same method of use, parts and construction however with a shape complementing that of the ring-style feeder assembly 32. The cover for the cradle-style feeder and the ring-style feeder differ primarily only by overall cover shape as a shape of the top wall of the cover dictates the shape of the side and thus an overall cover shape. The inventor notes that the cover shape is not merely a function of the welding but an advantageous characteristic of the cover 10 because it creates an inner, bale-contacting and feeder assembly-facing side of the cover and an outer, weather-exposed and weather-facing side, and the cover shape preserves the cleanliness of the feeder assembly-facing side. Removing the cover 10 and having it contact a ground surface will still protect the inner, feeder assembly-facing side of the cover from contamination with feces, etc. that may exist on the ground surface because of the cover shape naturally folds so as to keep the inner sides together and away from the ground surface. In contrast, a prior art tarp that is repurposed to cover the feeder typically does not have a clearly designated "outward-facing side" and "inward-facing side", and no easy way to prevent the clean "inward-facing side" from accidentally contacting the ground surface due to the flat nature of the prior art tarp, unless multiple people hold edges and carefully position or remove the tarp. The cover 10 described herein is specifically designed to be used and removed by a single person, with the main purpose of the invention being to protect the round feed bale 34 from spoilage while on the feeder assembly 26. The cover 10 is superior to a general purpose tarp and the inventor's experiments have shown the cover 10 is able to withstand high winds, snow, rain, hot sun, and freeze and thaw cycles typical to a zone 5b Western Pennsylvania climate.

Ring-style feeders 30 for horses have a standard diameter of 8 feet, with a vertical height of the feeders varying from about 40 to 50 inches tall. The round bale 34 sits in the ring-style feeder assembly 30 on one of its flat sides and extends above the sides of the feeder 30 typically by no more than a 5 inches. Ring-style feeders 30 allow the bale 34 to sit on the ground surface, although many horse owners place pallets on the ground to prop the bale 34 off the ground to keep it clean and to minimize moisture absorption. A popular ring-style feeder suitable for use with the cover 10 is the Equine Pro Hay Feeder made by Tarter Farm and Ranch Equipment of Dunnville, Ky. USA that is approximately 48 inches tall. Cradle-style feeders 32, where the bale 34 lies on its curved side in the feeder 32, are generally taller and hold the bale 34 up higher off the ground. A popular cradle-style feeder made by Tarter is the Galvanized Cradle Bale Feeder that is 45 inches tall, 78.5 inches wide and 84.5 inches long. The side wall of the cover 10 must be long enough to completely cover the bale 34 in the feeder assembly 30 32, but not so long as to have the pocket 22 drag on the ground surface. For the feeder assemblies 30 32 shown in the Figures, the cover 10 would ideally cover the entire feeder assembly down to a lowermost perimeter tube of the feeder. For the Tarter Equine Pro feeder with a hay saver, which features a solid side that prevents the horses from pulling hay out near the ground surface, the side wall height can be shortened so that the pocket 22 could in fact be positioned so as to be just below tubing of the feed access portion of the feeder. Similarly, since the cradle-style feeder 32 props the bale 34 off the ground, with approximately half of the bale 34 extending vertically beyond an uppermost edge of the cradle-style feeder 32, the side wall of the cover could be shortened so as to position the pocket just below a cradle portion of the feeder. The inventor however believes the cover 10 is best designed to cover the entire feeder, even for feeders with hay savers, as this also protects the expensive feeder, which retails for hundreds of dollars, as these feeders are durable but not impervious to the effects of the weather.

It is to be understood that the above-described arrangements are only illustrative of the application of the principles of the present invention. Numerous modifications and alternative arrangements may be devised by those skilled in the art without departing from the scope of the present invention. The inventor notes that the top wall of the cover, for instance, is shown in the Figures as a bipartite top wall, however, a single piece of vinyl or other waterproof, weldable material could be used. The inventor notes that large pieces of material are more difficult to procure and thus more expensive to use, as well as more difficult to manufacture into a form-fitting cover as the seams act as joints that allow for better fit. Welding is the preferred method of joining the vinyl canvas, and typically involves the application of both heat and pressure, although it is possible to use conventional sewing to bind the sheets together so long as the seams are then waterproofed using sprays, tapes, and other known methods for waterproofing sewing seams.

What is claimed is:

1. A cover for a ring-style feeder assembly comprising a ring-style feeder and a round bale, comprising:
    a top wall comprised of a pair of sheets welded together by a top weld, the top wall having an area with a perimeter along an outermost edge of the area, the top wall defining a shape of a circle;
    a side wall having an uppermost edge and an opposed lowermost edge defining a vertical height, the side wall having an outward-facing side and a feeder assembly-facing side;
    a perimeter weld joining the uppermost edge of the side wall to the top wall perimeter;
    a pocket having an outward-facing side and a feeder assembly-facing side, the pocket formed into the lowermost edge of the side wall;
    a first access hole formed in the outward-facing side of the pocket, the first access hole configured as a U-shaped hole;
    a second access hole formed into the outward-facing side of the pocket, the second access hole being in a spaced apart relationship with the first access hole;
    a flap positioned adjacent to the first and second access holes, the flap sized and shaped to cover both access holes, the flap being either welded or removably affixed to the cover; and
    a ratchet-strap assembly having a strap with a strap length and a ratchet for strap length adjustment;
    wherein the first and second access holes are sized and shaped to receive the strap;
        wherein the strap is contained within the pocket and the strap length is adjustable by the ratchet positioned between the first and second access holes;
    wherein the top wall, side wall and perimeter weld define a cylindrical cover shape;
    wherein the cover has a total area sufficient to cover and enclose a ring-style feeder assembly when a round bale is positioned within the ring-style feeder;
    wherein the top wall and side wall are made of a waterproof material;
    wherein the area of the top wall is sized and shaped to cover a top side of the ring-style feeder assembly such that the perimeter weld is positioned at an uppermost perimeter edge of a side wall of the ring-style feeder assembly; and
    wherein the pocket is positioned below a lowermost portion of the round bale and above a ground surface supporting the ring-style feeding assembly when the top wall is positioned on an uppermost surface of the ring-style feeder assembly.

2. The cover in claim 1, wherein the waterproof material is 10 oz. vinyl canvas.

3. A cover for a cradle-style feeder assembly comprising a cradle-style feeder and a round bale, comprising:
    a top wall comprised of a pair of sheets welded together by a top weld, the top wall having an area with a perimeter along an outermost edge of the area, the top wall defining a shape of a rectangle;
    a side wall having an uppermost edge and an opposed lowermost edge defining a vertical height, the side wall having an outward-facing side and a feeder assembly-facing side;
    a perimeter weld joining the uppermost edge of the side wall to the top wall perimeter;
    a pocket having an outward-facing side and a feeder assembly-facing side, the pocket formed into the lowermost edge of the side wall;

a first access hole formed in the outward-facing side of the pocket, the first access hole configured as a U-shaped hole;

a second access hole formed into the outward-facing side of the pocket, the second access hole being in a spaced apart relationship with the first access hole;

a flap positioned adjacent to the first and second access holes, the flap sized and shaped to cover both access holes, the flap being either welded or removably affixed to the cover; and a ratchet-strap assembly having a strap with a strap length and a ratchet for strap length adjustment;

wherein the first and second access holes are sized and shaped to receive the strap;

wherein the strap is contained within the pocket and the strap length is adjustable by the ratchet positioned between the first and second access holes;

wherein the top wall, side wall and perimeter weld define a rectangular box-like cover shape having four rounded corners;

wherein the cover has a total area sufficient to cover and enclose a cradle-style feeder when a round bale is positioned within the cradle-style feeder;

wherein the top wall and side wall are made of a waterproof material;

wherein the area of the top wall is sized and shaped to cover a top side of the cradle-style feeder such that the perimeter weld is positioned at an uppermost perimeter edge of a side wall of the cradle-style feeder assembly; and wherein the pocket is positioned below a lowermost portion of the round bale and above a ground surface supporting the cradle-style feeding assembly when the top wall is positioned on an uppermost surface of the cradle-style feeder assembly.

4. The cover in claim 3, wherein the waterproof material is 10 oz. vinyl canvas.

\* \* \* \* \*